United States Patent [19]
Sifniades et al.

[11] 3,862,985
[45] Jan. 28, 1975

[54] RESOLUTION OF LYSINEAMIDE

[75] Inventors: Stylianos Sifniades, Parsippany;
Robert Fuhrmann, Morris Plains;
Allen A. Tunick, Denville, all of N.J.

[73] Assignee: Allied Chemical Corporation, New York, N.Y.

[22] Filed: Aug. 27, 1973

[21] Appl. No.: 391,100

Related U.S. Application Data

[62] Division of Ser. No. 167,020, July 28, 1971, Pat. No. 3,773,786.

[52] U.S. Cl............................................. 260/561 A
[51] Int. Cl........................................... C07c 103/00
[58] Field of Search................................ 260/561 A Primary Examiner—Lewis Gotts
Assistant Examiner—Ethel G. Love
Attorney, Agent, or Firm—Arthur J. Plantamura

[57] ABSTRACT

L-lysineamide dihydrochloride can be isolated by preparing the intermediate D- and L-lysineamide-L-pyrrolidone carboxylate hydrochloride salts which can be separated from alkanol solution by fractional crystallization. The L-lysineamide pyrrolidone carboxylate hydrochloride salt is then treated with excess hydrogen chloride to form the desired L-lysineamide dihydrochloride.

7 Claims, No Drawings

RESOLUTION OF LYSINEAMIDE

This is a division of application Ser. No. 167,020, filed July 28, 1971, now U.S. Pat. No. 3,773,786.

RESOLUTION OF LYSINEAMIDE

This invention relates to a process for resolving lysineamide. More particularly, this process relates to a process for separating D- and L-lysineamide salts and racemizing the D-lysineamide for recycle.

BACKGROUND OF THE INVENTION

L-lysineamide and its hydrochloride salts are useful as food supplements, while the corresponding D-lysineamide and its salts are biologically inactive. Since lysineamide is prepared as a mixture of both D- and L-forms, means of separating or resolving the optically-active forms from each other are required. Further, in order to provide an economic process, the undesired D-form must be racemized, thus increasing the overall yield of the desired L-form.

SUMMARY OF THE INVENTION

The present process provides an economic method for forming L-lysineamide dihydrochloride from DL-lysineamide.

It has been discovered that DL-lysineamide, when treated with L-pyrrolidone carboxylic acid and hydrogen chloride in solution, forms a double salt mixture of L-lysineamide-L-pyrrolidone carboxylate hydrochloride and D-lysineamide-L-pyrrolidone carboxylate hydrochloride, which mixture can be readily separated by fractional crystallization. The L-lysineamide-L-pyrrolidone carboxylate hydrochloride can be decomposed with additional hydrogen chloride to form the desired L-lysineamide dihydrochloride. The by-product D-lysineamide-L-pyrrolidone carboxylate hydrochloride enantiomer can be treated in known manner, as with an ion exchange resin, to form D-lysineamide which can be racemized to DL-lysineamide and recycled. Free L-pyrrolidone carboxylic acid and hydrogen chloride can also be recovered and reserved for recycle. Thus yields of about 80% of the L-lysineamide salt can be obtained from the DL-lysineamide starting material per cycle in an economic manner.

DETAILED DISCUSSION OF THE INVENTION

The DL-lysineamide starting material is dissolved in a suitable solvent, such as an anhydrous lower alkanol, i.e., methanol, ethanol, isopropanol and the like, and reacted with one mol each of hydrogen chloride and L-pyrrolidone carboxylic acid per mol of lysineamide to form the corresponding salt mixture of L-lysineamide-L-pyrrolidone carboxylate hydrochloride and D-lysineamide-L-pyrrolidone carboxylate hydrochloride.

The hydrogen chloride can be added directly as hydrogen chloride, but more conveniently is added in alcoholic solution using the same alcohol employed as solvent. The order of addition of the two acids is not critical, and 1:1 molar mixtures of the two acids can also be employed.

The mixture is stirred or warmed until a clear solution is obtained. This solution is then allowed to stand until the L-lysineamide-L-pyrrolidone carboxylate hydrochloride salt precipitates. Preferably a small amount of seed crystals of the desired product are added to the solution to aid crystallization. The crystalline product is recovered in conventional manner, as by filtration or centrifugation, washed and dried. The product can be recrystallized to further purify it if desired. The mother liquor containing the D-lysineamide-L-pyrrolidone carboxylate hydrochloride and solvent is reserved.

The L-lysineamide-L-pyrrolidone carboxylate hydrochloride can be readily decomposed to form the desired L-lysineamide dihydrochloride by adding an excess of hydrogen chloride. The mixture is stirred and allowed to stand. The crystalline product is recovered in conventional manner, as by filtering, washing, and drying. The mother liquor, containing L-pyrrolidone carboxylic acid and hydrogen chloride in alcohol, can be reserved for recycle to form additional quantities of L-lysineamide-L-pyrrolidone carboxylate hydrochloride.

The mother liquor reserved from the mixed salt formation step, containing D-lysineamide-L-pyrrolidone carboxylate hydrochloride in alkanol, is treated in known manner, for example with an ion exchange resin to form the free amide.

When a cation exchange resin is employed, the D-lysineamide is adsorbed on the resin and the solvent containing L-pyrrolidone carboxylic acid and hydrogen chloride is collected for recycle to form additional pyrrolidone carboxylate hydrochloride salts. The D-lysineamide is eluted with a dilute base, such as an aqueous ammonia solution, thereby regenerating the cation exchange resin and forming an aqueous solution of D-lysineamide. The resultant aqueous solution is treated to remove the water in known manner, as by azeotropic distillation, evaporation and the like, and the solid D-lysineamide collected.

When an anionic exchange resin is employed, the acid moieties are adsorbed on the resin and a D-lysineamide-methanol solution is collected as the raffinate stream. The acids are eluted with an aqueous acid solution, such as dilute aqueous hydrochloric acid. In this case, water must be removed from the acid mixture before recycle, and the methanol evaporated from the D-lysineamide.

D-lysineamide can be racemized in an anhydrous solvent in the presence of a strong base.

Solvents suitable as media for the racemization step include dioxane andd aromatic hydrocarbons, particularly toluene. Ammonia can also be employed as a solvent media, as is disclosed in co-pending application of Fuhrmann, et al., "Racemization Process," Ser. No. 165,379, filed July 22, 1971, now abandoned.

Strong bases suitable for use in the racemization step include the alkali and alkaline earth metal salts, including their hydroxides, such as potassium hydroxide, sodium hydroxide and the like; carbonates, such as sodium carbonate, calcium carbonate and the like; oxides, such as calcium oxide, magnesium oxide and the like; amides, such as sodium amide, lithium amide and the like; alcoholates, such as sodium methoxide, potassium ethoxide and the like; and quaternary ammonium compounds, such as tetrabutyl ammonium hydroxide, tetraisopropyl ammonium hydroxide and the like. The amount of base employed is not critical, however, generally from about 0.2 to about 4 percent by weight of lysineamide will be employed.

The amount of solvent employed is not critical, but generally, solutions containing at least 5 percent by weight of lysineamide up to 40 percent by weight will be employed so that the necessity of handling large quantities of solvent will be avoided.

The temperature of the reaction can be from about room temperature up to the decomposition temperature of lysineamide, but generally temperatures of from 75° – 140°C. will be employed. The time required for complete reaction will vary depending upon the reaction conditions employed and is readily determinable by one skilled in the art by monitoring the optical activity of the product. Under optimum conditions periods of about 2 hours will be adequate for complete racemization.

The product, DL-lysineamide, can now be recycled to prepare additional quantities of the pyrrolidone carboxylate hydrochloride salt of the invention.

The combined L-pyrrolidone carboxylic acid and hydrogen chloride streams also can be recycled, with appropriate adjustments of concentration if required.

It will be understood by one skilled in the art that the present process is equally applicable to the preparation of D-lysineamide dihydrochloride if desired.

The invention will be further illustrated by the following examples, but it is to be understood that the invention is not meant to be limited to the details described therein. In the examples, all parts and percentages are by weight unless otherwise noted.

Thin layer chromatograms were developed using as solvent 25 parts of glyme to six parts of concentrated aqueous ammonia. The chromatograms were visualized with UV light and ninhydrin.

The degree of racemization was determined by comparing the optical rotation, measured in 1 N hydrochloric acid solution of the racemized product, with the known value for the fully resolved product.

EXAMPLE 1

To a solution of 0.288 part of DL-lysineamide in 1 part by volume of methanol was added 0.32 part by volume of 6 N methanolic hydrochloric acid and 0.248 part of L-pyrrolidone carboxylic acid. A clear solution was obtained after refluxing one minute. Seed crystals of L-lysineamide-L-pyrrolidone carboxylate hydrochloride (0.005 part) were added and the solution allowed to stand for 5 hours at 25°C. with occasional stirring. The mixture was filtered, the crystalline product washed with 2 parts by volume of methanol and dried.

L-lysineamide-L-pyrrolidone carboxylate hydrochloride was obtained in 49 percent yield (0.150 part) having a melting point of 147° – 152°C.

The structure of the product was confirmed by potentiometric titration with silver nitrate which showed an argentimetric equivalent of the product of 310 (theoretical 311). The product had an optical rotation $[\alpha]_D 20$ of +2.84, which corresponds to a mixture containing 65.6 percent of the L-lysineamide-L-pyrrolidone carboxylate hydrochloride, the remainder being DL-lysineamide-L-pyrrolidone carboxylate hydrochloride.

EXAMPLE 2

A solution of 1.82 parts DL-lysineamide hydrochloride and 1.29 parts of L-pyrrolidone carboxylic acid in 10 parts by volume of refluxing methanol was prepared and cooled to 60°C. Seed crystals of L-lysineamide-L-pyrrolidone carboxylate hydrochloride were added and the mixture allowed to cool slowly to 25°C. After standing for 15 hours, the crystals were collected by filtration. A 60 percent yield (0.933 part) of the product was obtained having a melting point of 147° – 153°C.

$[\alpha]_D 20$ was +4.30 which corresponds to a mixture containing 78 percent of L-lysineamide-L-pyrrolidone carboxylate hydrochloride.

EXAMPLE 3

6.21 Parts of L-lysineamide-L-pyrrolidone carboxylate hydrochloride was stirred in 27 parts by volume of a methanolic solution of 1.3 N hydrochloric acid. The temperature, which had risen to 35°C., was reduced to 25°C. and the mixture let stand several hours. The mixture was filtered and the crystalline product washed with methanol and dried.

An 85.3 percent yield (3.72 parts) of L-lysineamide dihydrochloride was obtained, as determined by potentiometric titration with silver nitrate.

$[\alpha]_D 20$ was +16.7, which corresponds to 100 percent pure product.

EXAMPLE 4

To a refluxing water-free solution containing 1.30 parts of L-lysineamide per 40 parts by volume of toluene was added 0.0065 part of dry, powdered sodium hydroxide. The mixture was kept at reflux for 0.5 hour while stirring under a nitrogen atmosphere. After settling, the clear solution was decanted and the reaction vessel rinsed twice with 15 parts by volume portions of hot toluene. The combined toluene solutions were cooled to 0°C. and the crystalline precipitate collected by filtration, washed with 5 parts by volume of toluene and dried.

A 97.7 percent yield (1.27 parts) of lysineamide was obtained having a melting point of 80° – 92°C. Only a single spot was obtained on a thin layer chromatogram. The product had an optical rotation in 1 N hydrochloric acid $[\alpha]_D 20$ of +11.3, corresponding to 60 percent racemization.

EXAMPLE 5

The procedure of Example 4 was followed except employing 0.755 part of L-lysineamide per 25 parts by volume of toluene and substituting 0.0122 part sodium methoxide as the base. Reflux was continued for 2 hours.

The product lysineamide was recovered in 87.7 percent yield (0.660 part) having a melting point of 79° – 81°C. $[\alpha]_D 20$ was +2.5, corresponding to 92 percent racemization.

EXAMPLE 6

The procedure of Example 4 was followed except employing 0.021 part of sodium hydroxide and continuing reflux for 2 hours. The product lysineamide was 100 percent racemized.

EXAMPLE 7

The procedure of Example 4 is followed except substituting D-lysineamide. Equivalent results are obtained.

We claim:

1. A process for preparing L-lysineamide dihydrochloride which comprises reacting DL-lysineamide with one mol each of L-pyrrolidone carboxylic acid and hydrogen chloride per mol of lysineamide in the presence of a solvent, recovering L-lysineamide-L-pyrrolidone carboxylate hydrochloride, adding an excess of hydrogen chloride and recovering the product.

2. A process according to claim 1 wherein the solvent is a lower alkanol.

3. A process according to claim 1 wherein the solvent is methanol.

4. A process for preparing L-lysineamide dihydrochloride which comprises:
   a. reacting DL-lysineamide with one mol each of L-pyrrolidone carboxylic acid and hydrogen chloride per mol of lysineamide in the presence of an alkanol solvent,
   b. recovering L-lysineamide-L-pyrrolidone carboxylate hydrochloride,
   c. reserving the mother liquor from step (b),
   d. adding an excess of hydrogen chloride to the solid product of step (b),
   e. recovering L-lysineamide dihydrochloride,
   f. recycling the mother liquor from step (e) to step (a), recycle,
   g. treating the mother liquor reserved from step (c) with a cation exchange resin, thereby adsorbing D-lysineamide and recovering L-pyrrolidone carboxylic acid and hydrogen chloride for reyclce,
   h. eluting D-lysineamide from the cation exchange resin as an aqueous solution,
   i. removing the water from the solution obtained from step (h),
   j. racemizing D-lysineamide with a strong base in the presence of a hydrocarbon solvent,
   k. recycling DL-lysineamide to step (a).

5. A process according to claim 4 wherein the hydrocarbon solvent step (j) is toluene.

6. A process for preparing L-lysineamide dihydrochloride which comprises:
   a. reacting DL-lysineamide with one mol each of L-pyrrolidone carboxylic acid and hydrogen chloride per mol of lysineamide in the presence of an alkanol solvent,
   b. recovering L-lysineamide-L-pyrrolidone carboxylate hydrochloride,
   c. reserving the mother liquor from step (b),
   d. adding an excess of hydrogen chloride to the solid product of step (b),
   e. recovering L-lysineamide dihydrochloride,
   f. recycling the mother liquor from step (e) to step (a),
   g. treating the mother liquor reserved from step (c) with an anion exchange resin, thereby adsorbing L-pyrrolidone carboxylate and chloride ions, and recovering D-lysineamide as an alkanol solution,
   h. removing the alkanol from the solution obtained in step (g),
   i. racemizing D-lysineamide with a strong base in the presence of a hydrocarbon solvent,
   j. recycling DL-lysineamide to step (a),
   k. eluting the L-pyrrolidone carboxylate and chloride cations with dilute aqueous hydrochloric acid from the anion exchange resin,
   l. removing water from the solution obtained in step (k),
   m. recycling the combined L-pyrrolidone carboxylic acid and hydrogen chloride obtained in step (1) to step (a).

7. A process according to claim 6 wherein the hydrocarbon solvent of step (i) is toluene.

* * * * *